(12) United States Patent
Spitz

(10) Patent No.: US 6,700,997 B1
(45) Date of Patent: Mar. 2, 2004

(54) METHOD OF EVALUATING THE PRINT QUALITY OF 2-DIMENSIONAL DATA CARRYING GRAPHICAL SYMBOLS

(76) Inventor: Glenn Steven Spitz, 4 Cain Dr., Brentwood, NY (US) 11717

( * ) Notice: Subject to any disclaimer, the term of this patent is extended or adjusted under 35 U.S.C. 154(b) by 561 days.

(21) Appl. No.: 09/587,601

(22) Filed: Jun. 5, 2000

(51) Int. Cl.[7] ................................................ G06K 9/00
(52) U.S. Cl. ..................................................... 382/112
(58) Field of Search ....................... 382/112; 235/462.1, 235/462.11, 462.27, 462.24

(56) References Cited

U.S. PATENT DOCUMENTS

| | | | | |
|---|---|---|---|---|
| 3,868,634 A | * | 2/1975 | Dolch | 235/462.07 |
| 5,194,720 A | * | 3/1993 | Reinnagel et al. | 235/437 |
| 5,235,167 A | | 8/1993 | Dvorkis et al. | 235/462 |
| 5,343,028 A | | 8/1994 | Figarella et al. | 235/462 |
| 5,414,250 A | * | 5/1995 | Swartz et al. | 235/462.1 |
| 5,446,271 A | | 8/1995 | Cherry et al. | 235/462 |
| 5,487,115 A | | 1/1996 | Surka | 382/296 |
| 5,523,552 A | * | 6/1996 | Shellhammer et al. | 235/462.09 |
| 5,524,068 A | | 6/1996 | Kacandes et al. | 382/258 |
| 5,633,488 A | * | 5/1997 | Spitz | 235/462.27 |
| 5,698,833 A | | 12/1997 | Skinger | 235/462 |
| 5,729,001 A | | 3/1998 | Spitz | 235/462 |
| 5,814,802 A | | 9/1998 | Hecht et al. | 235/455 |
| 5,920,056 A | | 7/1999 | Bonnet | 235/383 |
| 6,135,354 A | * | 10/2000 | Kubon | 235/462.11 |
| 6,325,288 B1 | * | 12/2001 | Spitz | 235/462.12 |
| 6,490,376 B1 | * | 12/2002 | Au et al. | 382/290 |

* cited by examiner

Primary Examiner—Daniel Mariam
Assistant Examiner—Shefali Patel
(74) Attorney, Agent, or Firm—Island Patent; F. Scott Tierno

(57) ABSTRACT

Methods of collecting and or processing a 2-dimensional image containing image data of a data carrying graphical symbol includes the processing of the image data to determine virtual scan reflectance profile (SRP) signals associated with desired scan paths across the graphical symbol. The virtual SRP signals may then be processed to provide for the evaluation of the print quality of the imaged graphical symbol.

15 Claims, 7 Drawing Sheets

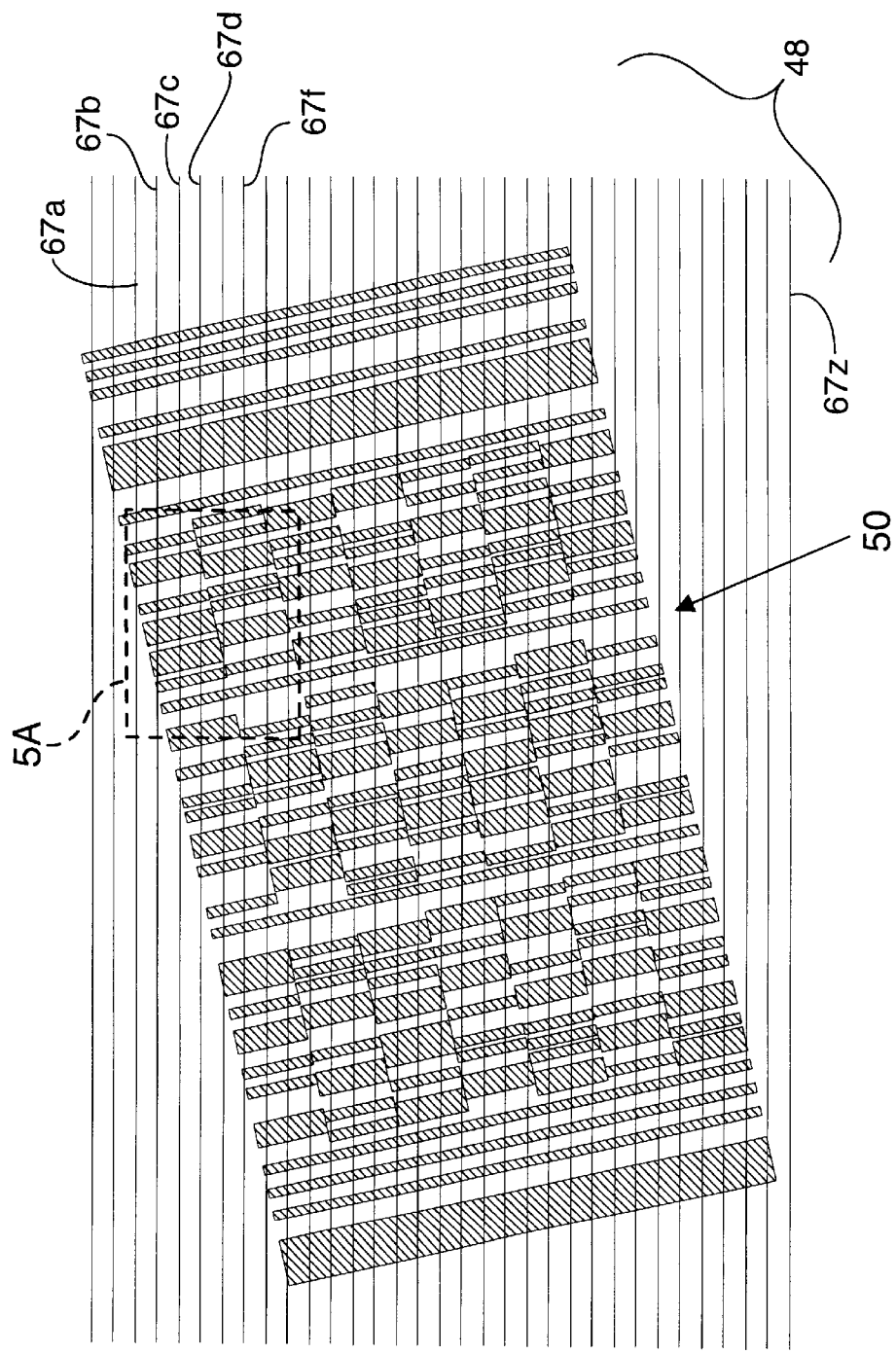

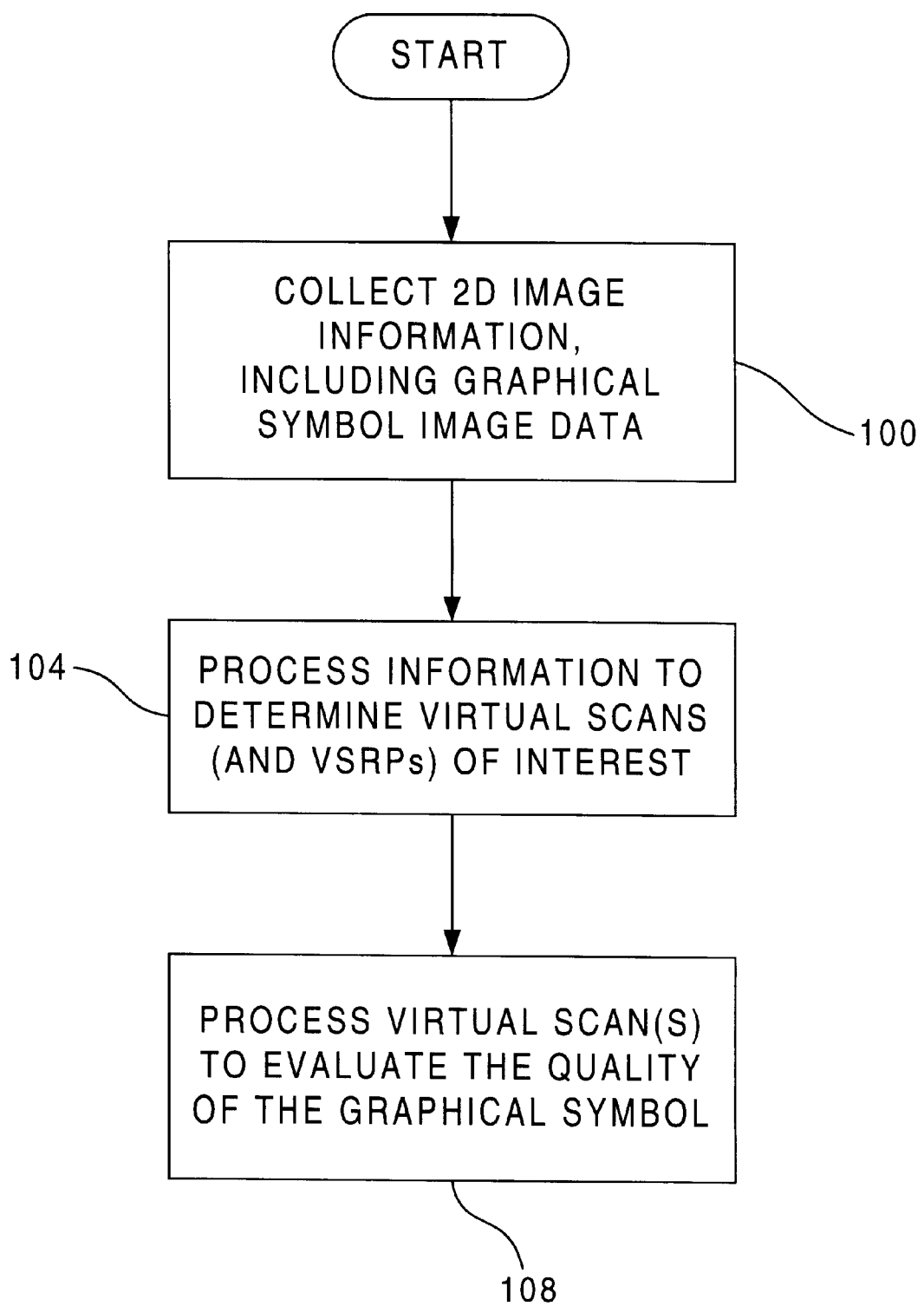

METHOD OF EVALUATING THE PRINT QUALITY OF 2-DIMENSIONAL DATA CARRYING GRAPHICAL SYMBOLS

CROSS REFERENCE TO RELATED APPLICATIONS

The subject matter provided herein is related to that of U.S. Pat. No. 5,729,001, which issued on Mar. 17, 1998, and is hereby incorporated by reference. In addition, this application is further related to U.S. Pat. No. 6,325,288, which issued on Dec. 4, 2001.

TECHNICAL FIELD

The present invention relates generally to evaluation and verifier systems. More particularly, the invention relates to methods of processing 2-dimensional (2D) image data to evaluate the relative print quality of a data carrying symbol. Exemplary data carrying symbols include 1D and 2D bar code symbols, which may be contained or embedded within collected image data.

BACKGROUND ART

The advent of bar code symbols, including 1D and 2D symbologies, has lead to a revolutionary change in the way products, packages, shipments, and the like, are handled, inventoried, and tracked. At the present time virtually every product made that is individually packaged, and or shipped from a first location to a second, has a bar code symbol associated with it. The development and acceptance of 2D bar code symbologies, such as PDF-417, Data Matrix, and others, has further expanded the use of bar code technology into new and diverse markets—in many countries around the world.

As always, there is a need to provide for an efficient and dependable evaluation of the (print) quality of 1D and 2D bar code symbols, especially as they are printed or otherwise disposed upon a substrate. Such verification may be performed on-line, say as a printing web is running, or alternately off-line, by examining one or more recently printed symbols. It should be noted that a large number of varied printing techniques are employed to apply bar code indicia to packages, containers, and other substrates. In all cases there is a well established need to verify the quality of the resulting indicia/symbol. Considerations such as the decodability, symbol contrast, first read rate (FRR), substitution error rate (SER), and others, are of critical importance when evaluating the quality of bar code indicia.

Proper quality verification of certain types of data carrying graphical symbols, including stacked and matrix 2-dimensional bar code symbols, provides an especially difficult challenge. This is particularly true when analyzing certain parameters that are derived from measurements of a scan reflectance profile (SRP) signal, or equivalent data sets, which will be described by way of the preferred embodiments disclosed herein. A guideline from the American National Standards Institute (ANSI) titled "Bar Code Print Quality Guideline" defines several such parameters. This evaluation guideline (ANSI X3.182-1990), which is well known to skilled persons, is hereby incorporated herein by reference. Although the ANSI print quality guideline is generally associated with 1-dimensional bar code symbols, it may certainly be extended to 2-D symbols as well. In fact, the quality measurement specifications for certain symbologies, such as PDF417, specifically reference the ANSI specification. Importantly, the ANSI specification provides several measurement methodologies (see section 4) and includes the definition of a number of 'figures of merit' or 'quality parameters', which can be determined from one or more digitized and stored scan reflectance profile signals.

A major problem when scanning and verifying high density bar code symbols, especially 2D symbols such as a PDF417, is the need to take a plurality of scans across the symbol using desired scan paths that are substantially orthogonal to the height of elements (such as start bars, stop bars, as well as spaces and or bars of particular stacked row characters). This difficulty of providing complete or substantial verification of 2D symbols is acknowledged in the specifications of 2D symbologies. For example, when considering the print quality evaluation of PDF417 bar coded symbols, known specifications recommend verification only using the start and stop elements, which can easily be scanned in a manual or automated manner. A primary problem with full verification of a 2D symbol is the need to scan or otherwise capture an image of a 2D symbol at a specific (orthogonal) angle. As such, when collecting an image via an imaging array (e.g., a CCD imaging device) or a plurality of substantially parallel and equi-spaced scans taken along a height of the symbol, the symbol is most preferably 'imaged' at a specific (non-arbitrary) angle. When this is the case, each scan taken may then be directly analyzed to assess the print quality of that portion of the scanned symbol.

When scanning and data collection occur at a non-orthogonal angle, which may be termed an 'arbitrary angle', direct analysis is generally not possible. Further, a digitized image containing a 1D or 2D bar code oriented at some arbitrary angle, is not trivial to analyze to make a thorough print quality assessment. It is for this reason certain specifications (e.g., the PDF417 AIM Spec) recommend just a partial evaluation of a 2D graphical symbol via an analysis of portions of an SRP signal corresponding to only the start and stop elements. This does not provide for a very good indication of the quality of the entire indicia!

Therefore, skilled persons will recognize a need for methods and means to facilitate and or support ANSI level quality verification and evaluation (and equivalents thereof) of all or selected portions of 1D and 2D bar code symbols— even when scanned or imaged at some arbitrary angle. Further, such evaluation must be provided even when the symbol or indicia of interest is contained within other printed textual and graphical information, that is imaged, digitized, and stored as a plurality of data values (available, for example, as a 2D raster-type image).

A full understanding of the present invention, including an understanding of a number of capabilities, characteristics, and associated novel features, will result from a careful review of the description and figures of several embodiments provided herein. Attention is called to the fact, however, that the drawings and descriptions are illustrative only. Variations and alternate embodiments are contemplated as being part of the invention, limited only by the scope of the appended claims.

SUMMARY OF THE INVENTION

In accordance with the present invention, methods are provided for collecting and or processing a 2-dimensional image, which contains image data of a data carrying graphical symbol, to enable a thorough print quality evaluation of the graphical symbol to be realized. The methods may commence with the collecting of a plurality of data values, with each data value representative of a level of reflectivity of an associated spatial image position within the 2-dimensional image. Once data values are available, the determining of scan paths, which may be termed 'virtual scan paths' along desired paths, may commence. Importantly, the determined desired paths traverse selected portions of the graphical symbol at a selected and desired orientation. Next, the extracting and or processing a plurality of the data values associated with each determined virtual scan path occurs, wherein each plurality of data values is representative of a digitized virtual scan reflectance profile signal that may be processed to determine and provide at least one figure of merit indicative of the print quality of an imaged data carrying graphical symbol contained within the 2-dimensional image.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 4 illustrates a more likely scan pattern comprising a plurality of equi-spaced, parallel scans taken at a somewhat arbitrary angle to the data carrying elements of a scanned graphical symbol.

FIG. 7 represents a flow chart of a preferred embodiment of a method of the invention.

PARTIAL LIST OF REFERENCE NUMERALS

20—1D bar code indicia
22—bar element of 20
24—space element of 20
28—(respective) scans of image region, including 20
34—scan reflectance profile (SRP) signal
36—positive peak
38—negative peak
48—2-dimensional image or image region
50—2-dimensional (2D) bar code indicia
54—start/stop elements or portion of 50
58—2D stacked portion of 50

58a—1D row or row element (of stacked portion 50)
62—(general/arbitrary) scan paths or scan lines
64—data values (generalized)
64a—data value (of a space)
64b—data value (of a bar)
66—ideal scan paths or scan lines
67—non-ideal scan paths
68—groupings (of data values)
70a, 70b—gray scale data values
80a—scanning means
80b—2D imaging array and scanning means
86a—signal conditioning and digitizing module
86b—signal conditioning and interface module
88—computer
90—results or quality indication
100+—flow chart blocks

DETAILED DESCRIPTION OF THE INVENTION

Figure 5A:
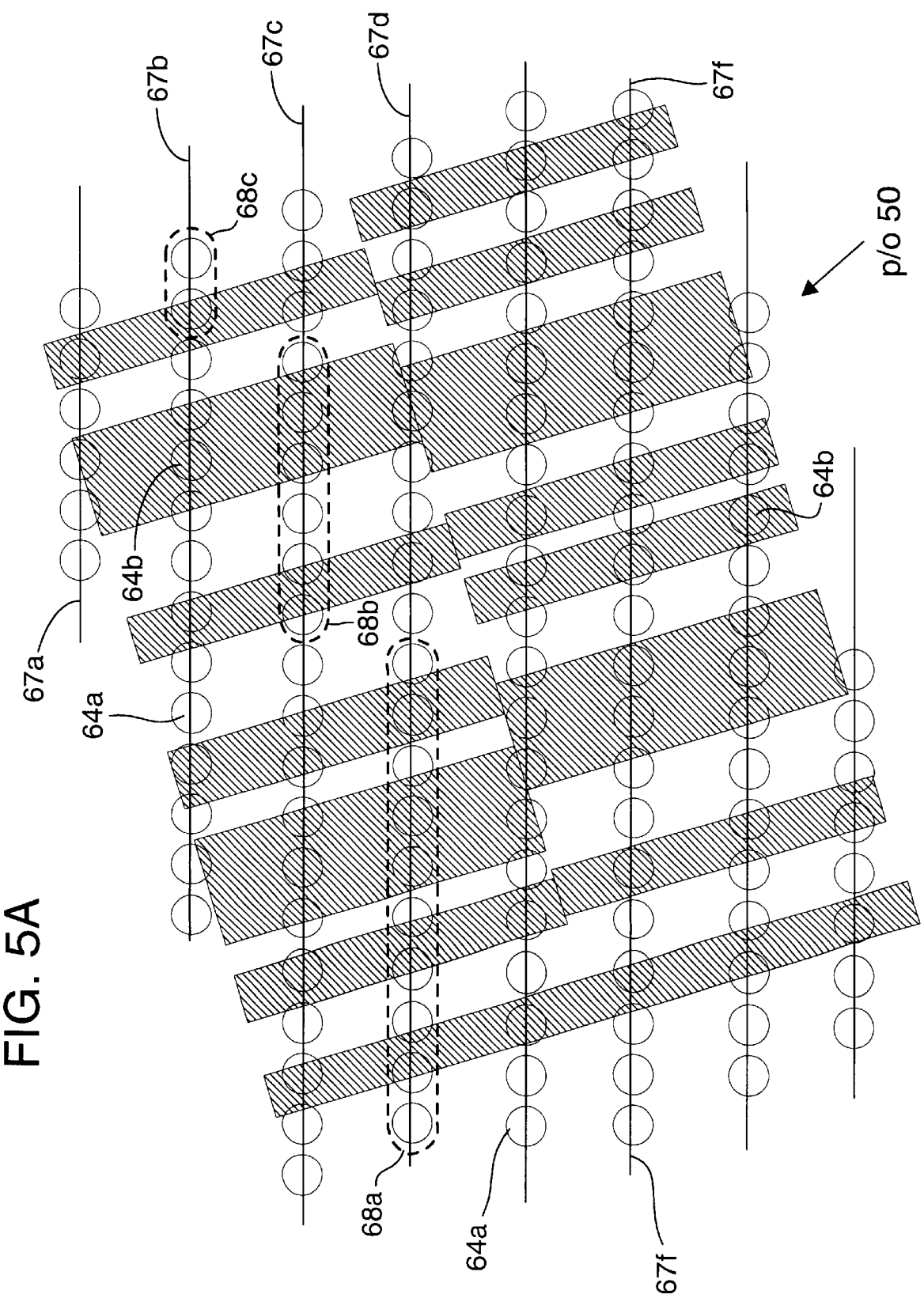
FIG. 5A provides an enlarged portion of the scanned graphical symbol of FIG. 4, further depicting sample point locations (or equivalently, gray scale pixel data locations), which may be stored as digitized values.

It is important to establish the definition of a number of terms and or expressions that will be used throughout this disclosure. The terms 'graphical symbol', 'data carrying graphical symbol', 'bar code symbol', and 'indicia', as well as other equivalents employed herein, may be assumed to include any type of symbol having a 2-dimensional face (area) encoded data within a visual or graphical symbol. For example, both 1D and 2D bar code indicia, including Code 39, UPC, MAXICODE, PDF417, and Data Matrix indicia, may be assumed to be examples of a graphical symbol in accordance with the present invention. The term 'data value' may be assumed to be a digitized sample value representative of a level of reflectivity at an imaged/scanned location. For example, each imaging element in a CCD imaging module is capable of producing a data value that may be applied and utilized to decode or evaluate the print quality of an imaged graphical symbol. It may be noted that terms such as sample value, sample data, reflectivity sample, etc., may be assumed to be equivalent to the term 'data value'. As will be discussed in detail below, a variety of scanning arrangements may be employed to provide a plurality of data values of a graphical region. The total collection of data values, or a selected subset thereof, may be termed 'image data' or 'image information'. Also, the definition of the expression "along at least a portion of the height of the graphical symbol", as applied when discussing the 'scanning' of a symbol or indicia in accordance with the invention, is to be defined as taking scans at a plurality of spaced positions or locations that may cover most of, or less preferably only a portion of, the height of a selected scanned symbol. For example, as can be seen in FIGS. 4 and 5A of this disclosure, and FIGS. 1 and 3 of U.S. Pat. No. 5,729,001, which was incorporated by reference above, the term 'along at least a portion of the height of the graphical symbol' may be realized by a taking, digitizing, and processing a plurality of adjacent (preferably equi-spaced) scans. The term 'collecting', as applied to the collecting of image data in the form of a plurality of data values, is to be broadly defined. As such, any suitable arrangement that enables such image data to be obtained from the actual symbol and made available (possibly including the storing the data values in a suitable storage device of a computer), may employ the present invention. Other important terms and definitions will be provided, as they are needed, to properly and concisely define the present invention and its associated novel characteristics and features.

Figure 1A:
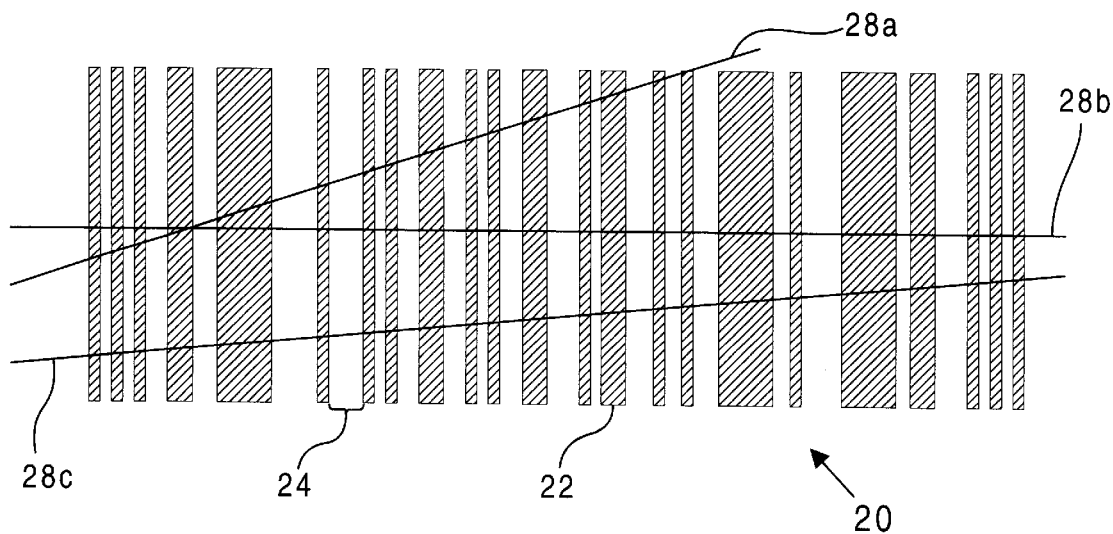
FIG. 1A depicts an exemplary 1-dimensional data carrying graphical symbol with a plurality of possible scans or scan paths indicated.
Figure 1B:
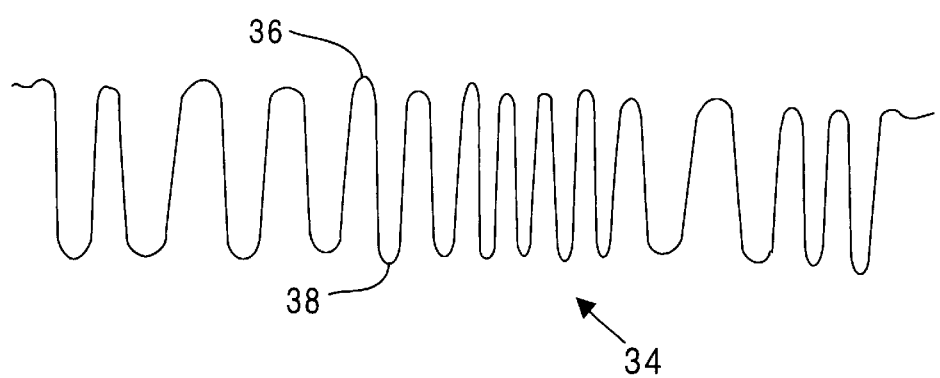
FIG. 1B is a representation of a scan reflectance profile (SRP) signal, which may result from a suitable scan of the graphical symbol of FIG. 1A.

Referring now to FIG. 1A, illustrated therein is a one dimensional data carrying graphical symbol 20. As embodied, the graphical symbol 20 is composed of a plurality of interwoven and elongated bars 22 and spaces 24. It may be noted that the bars 22 and spaces 24 may collectively be termed the 'elements' of graphical symbol 20. Such a graphical symbol may also be referred to as a 1D bar code. As depicted in FIG. 1A, the graphical symbol 20 may be scanned along respective scan paths 28 (or scan lines) by a suitable scanning means. For example, as shown, scan path 28a provides a 'partial scan' of a plurality of the bars 22 and spaces 24 of the graphical symbol 20. Scan paths 28b and 28c provide scan lines that cross each and every element of the indicia, and as such are considered preferable scan paths. As is well known in the art, a single scan 28a does not permit (with most common symbologies) the encoded information of the graphical symbol to be fully determined. In contrast, as scans 28b and 28c (each) scan or cross each element, a full scan reflectance profile 34 results, as depicted in FIG. 1B. The scan reflectance profile (SRP) signal 34 is typically digitized into a succession of data values. The data values, which would provide a level of reflectively for a plurality of scanned and sampled spatial locations along the scan path (e.g., 28b), may be processed resulting in the decoding of the information encoded within the graphical symbol 20. It is important to note that when processing the data values of a scan for decoding purposes, it is the edges, or more precisely the times between adjacent edges, that are of interest. When decoding a scanned indicia, the reflectively peaks and valleys, such as positive peak 36 and negative peak 38, respectively, are generally not of interest. In contrast, when considering the print quality of an indicia such as graphical symbols 20 or 50, the levels of reflectively are of major import. In particular, with ANSI level quality reporting, most of the ANSI quality attributes are primarily associated with the positive peaks and negative peaks of each scanned element.

Figure 2:
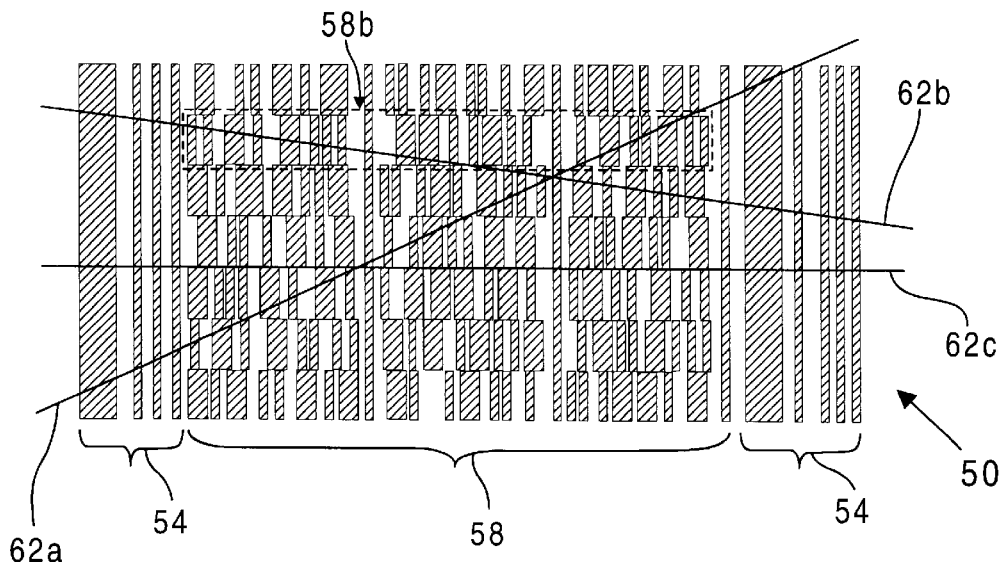
FIG. 2 shows a plurality of possible scan paths across a 2-dimensional graphical symbol.

Turning now to FIG. 2, an exemplary 2-dimensional data carrying graphical symbol 50 is depicted that is composed of start/stop regions 54 and a 2D stacked portion 58. As shown, the start/stop regions 54 are established along the entire height of the 2D symbol 50, as was the case with all bars 22 and spaces 24 of the 1D symbol 20. However, the 2D stacked portion 58 is formed by 'stacking' a plurality of reduced height 1D barcode symbols, such as 58b. For convenience, each of the reduced height 1D barcode symbols composing the stacked portion 58 may be termed a 'row element' or simply a 'row'. As such, the accurate scanning of the 2D stacked portion 58 is considerably more challenging, especially when attempting to apply full ANSI scanning requirements for print quality assessment to respective rows thereof. For example, as depicted each scan path or scan line shown in FIG. 2, provides a limited amount of data information. Consider the example scans depicted. Scan path 62a results in a partial scan across the graphical symbol 50, missing the right most start/stop region 54, and effectively all of the stacked portion 58. The next scan depicts a scan path 62b that provides a full scan of the start/stop regions 54, and also scans a possibly significant portion of row 58b within the stacked region 58. As will be further discussed below, if the scanning of row 58b is realized at a sufficiently small angle (with respect to the rows of the scanned symbol), then one or more 'characters' of a scanned row may be isolated and employed to determine print quality indications.

Returning to FIG. 2, a third scan path 62c is depicted as another undesired scan path. As shown, scan path 62c is positioned substantially orthogonal to the height of the bars and spaces of the graphical symbol 50, as desired. However, scan path 62c scans along a region including the top of one row and the bottom of a next higher row. As indicated above, the proper scanning of indicia such as graphical symbol 50 is somewhat challenging.

Figure 3:
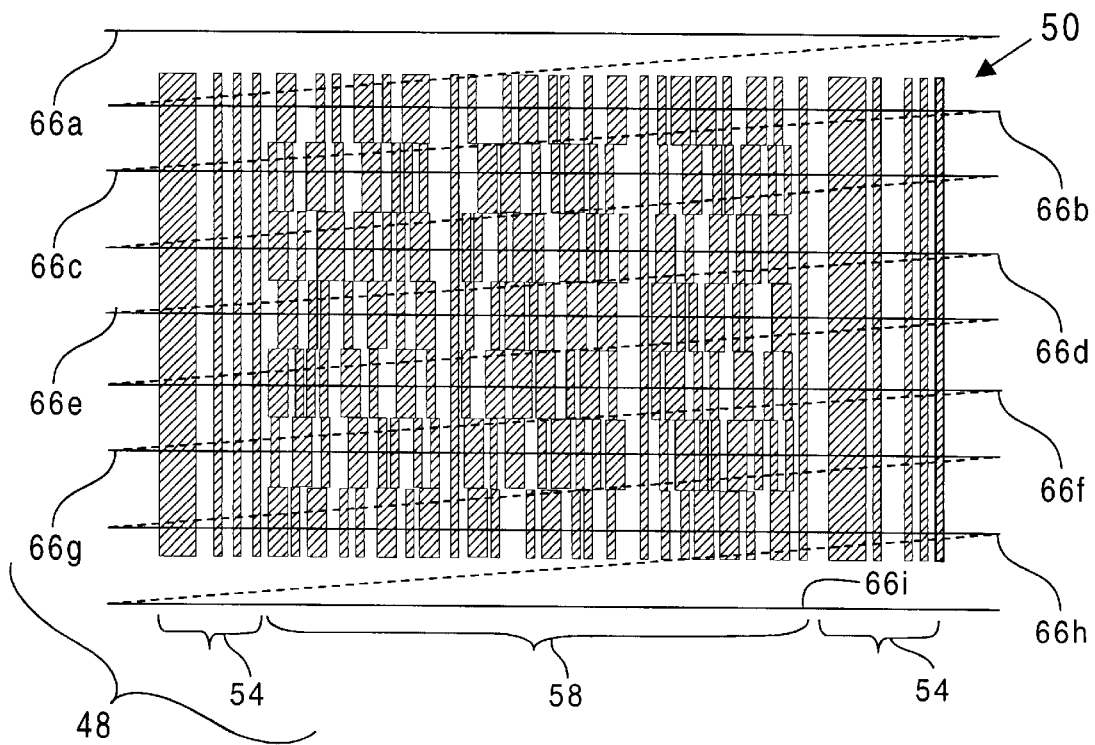
FIG. 3 illustrates a plurality of ideal, substantially equi-spaced, and parallel scan paths (or simply 'scans'), taken across a region including a 2D data carrying graphical symbol.

To fully and completely scan a 2D graphical symbol 50, a plurality of equi-spaced, parallel scan lines may be employed. An ideal plurality of such scan paths, including scan paths 66a, 66b, and so on through 66i, which may collectively referred to as scan paths 66, are depicted in FIG. 3. As shown, a 2-dimensional image region 48, includes a graphical symbol 50 and surrounding areas. The image region 48 may be nicely scanned by a succession of parallel and suitably spaced scan paths 66. A first possible scan path 66a, is situated above the graphical symbol 50. A subsequent scan path 66b provides a full scan of the start/stop regions 54 and also scans the first row 58a (not explicitly referenced) within the stacked region 58. The next scan of interest, 66c, again provides a full scan of the start/stop regions 54, while also very accurately "center scanning" the next lowest row of the stacked region 58. Accordingly, a plurality of idealized scans 66, as depicted for example by scan paths 66b through 66h, provides for the full and complete scanning of the graphical symbol 50 (for decoding purposes). As skilled individuals will appreciate, the scanning pattern depicted in FIG. 3 is highly idealized. First, it may be difficult to provide the absolute orthogonal scanning depicted, each of which provide for scans that clearly traverse a single row of the stacked portion 58. Further, it may be assumed the scan paths 66 of FIG. 3 represent a small sub-set of the actual number of scans that are made of the respective indicia or graphical symbol being evaluated. As is well known, reasonable ANSI level reporting must include multiple scans taken and considered along at least a portion of the height of the indicia being evaluated. Therefore, it may be assumed that, at minimum, the scans of FIG. 3, either directly or via processing and extrapolation, may be considered to provide an actual or reasonable approximation of ANSI level quality reporting of graphical symbol 50 (and equivalents).

Turning now to FIG. 4, there is provided a plurality of scan paths that are more likely to occur in practice. As can be seen, a plurality of scan paths 67, which include scans 67a through 67z, are depicted at an arbitrary, yet constant angle. It may be assumed that the scan paths 67 are shown with an exaggerated spacing for clarity, and that there may actually be many more scans made and employed for print quality analysis and reporting. In addition, it may be assumed that no single scan path may be used to provide for the full and complete decoding of any single row within the stacked portion 58 of graphical symbol 50. In the case where a small arbitrary angle exists during scanning, say in the range of 2 to 6 degrees, significant portions of a scanned row (say one or more characters) may be utilized directly to determine the print quality. For example, assume a scan is made that provides for 'character complete scanning' of portions of a row of a 2D indicia. The set of data values for each of the completely scanned characters, possibly collected from more than one row, may then be employed to determine one or more ANSI quality parameters. Elements of other partially scanned characters that are scanned along with the fully scanned characters may simply be ignored. The quality parameters determined, possibly from a plurality of rows and or scans, may then be combined to indicate an overall quality assessment. Alternately, the data values associated with each of a plurality of completely scanned characters, may be isolated and combined to form a version of a virtual SRP signal that may then be analyzed by ANSI or other desired standards. It should also be noted that in the above assumed case, the angle of scanning permitted analysis without necessarily employing 'stitching' techniques. Such techniques, which will be further discussed below, are required for use when larger scanning or imaging angles are utilized. The actual limit for what may be considered a 'small scanning angle' in the above situation, may most accurately be determined by the specific symbol being scanned, along with the symbol's size.

Returning to FIG. 4, a portion of the graphical symbol 50 is shown in FIG. 5A enlarged and in greater detail. As can be seen therein, each scan path, including scan paths 67a through 67z, provides a succession of spatial locations that are 'sampled', with each location providing a data value (or equivalently a reflectivity value) whose value is proportional to the level of reflectivity of the graphical symbol at a respective (spatial) location. For example, considering scan path 67b of FIG. 5A, a data value 64a is associated with a location (e.g., a space) having a high reflectivity, while data value 64b is associated with a low reflectivity (bar) region. When considering the imaging or scanning of a region 48 containing a graphical symbol 50, it is certainly possible to generate such information using scan paths 67a through 67z. The image data would most preferably be composed of a sufficient number of data values, with each having an associated spatial location, to enable suitable print quality reporting (such as ANSI level reporting). Importantly, even though no single scan path/line may provide a complete scan of a respective row within the stacked portion 58, techniques are available in the art to process and group data values 64 from different scan paths to provide a 'virtual scan path'. For example, U.S. Pat. No. 5,446,271 to Cherry et al. defines methods and algorithms to determine 'virtual scan lines' that may be extracted from 2D image data that is collected and processed for decoding purposes only. Yet other techniques and approaches are available to 'stitch' portions of a plurality of scans to enable decoding via a 'constructed' scan path (or equivalently an embodiment of a virtual scan path). Importantly, once the data values of a desired scan path (e.g., a virtual scan path) have been identified, an associated virtual SRP signal may then be processed to provide suitable print quality reporting.

Regardless of the specific algorithms employed, the goal is to select certain groupings of data values to provide for a virtual scan, and more specifically a 'virtual scan reflectance profile signal'—which is employed exclusively for print quality evaluations. Consider, for example, the groupings 68a, 68b, and 68c, of FIG. 5A. When extracted and grouped, groupings 68a, 68b, and 68c, provide for a full scan of the illustrated portion of the row of FIG. 5A. It is important to note that such a grouping, or equivalents, yield what may be termed a 'desired scan path' taken along what may be termed a 'selected orientation'. Each desired scan path would by definition have associated with it a plurality of data values that may also be collectively termed a 'digitized virtual scan reflectance profile signal' or simply a 'virtual SRP signal'. This approach, wherein virtual SRP signals are employed to provided a more complete (and preferred) level of print quality evaluation, has to date not been suggested or disclosed. As discussed above, the scanning paths 67 of FIGS. 4 and 5A would most preferably be spaced closer together (than illustrated), preferably with more sample locations provided for each scan path 67. As a result, a plurality of virtual SRP signals may be provided for each row of the stacked portion 58.

Figure 5B:
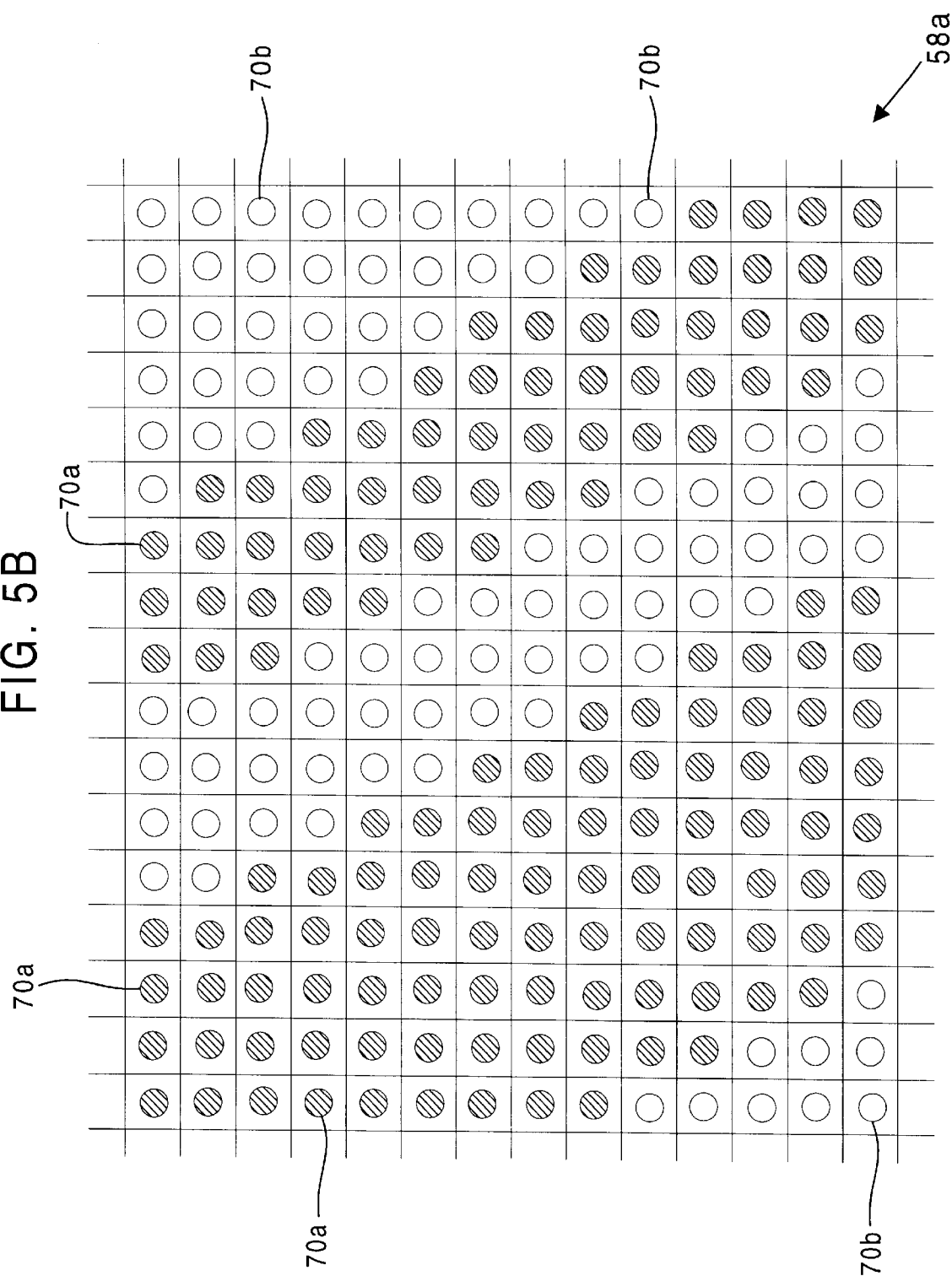
FIG. 5B depicts an enlarged portion of an imaged graphical symbol captured as a plurality of data values having an inherent spatial integrity.

Clearly, each virtual SRP signal determined for each row may be processed and ultimately combined to determine one or more figures of merit indicative of the overall print quality of the stacked portion 58 (as well as other scanned portions of the graphical symbol 50). The above approach for collecting data values may most preferably employ laser scanning methods and means. As skilled persons will appreciate, other devices and arrangements are available that may be employed to provide for the collection of 2D image data (in the form of a plurality of data values). For example, data values may be determined by charge-coupled devices (CCDs). A suitable CCD may also be termed a '2-dimensional imaging array'. As illustrated in FIG. 5B, a CCD or equivalent imaging means provides a plurality of data values in the form of gray scale information. Each data value is generally captured at the same instant. As depicted in FIG. 5B, the spacing of the data values is very uniform, with each depicted data value associated with a spatial image position. It may be assumed that a threshold level has been applied to determine data values 70a, which are associated with locations of low reflectivity, such as bars, and data values 70b, which are associated with high reflectivity locations, such as spaces.

It must be understood that there are many means and methods available to generate and collect a raster or grid type 2D image of a region (including therein a graphical symbol of interest) in the form of a plurality of sample or data values. Once collected, or possibly most efficiently as the data values are being collected, steps may commence to extract, group, and process a plurality of data values associated with, or defining, at least one (digitized) virtual SRP signal. Subsequently, each virtual SRP signal extracted may be processed to determine one or more figures of merit, quality indicators, and or quality attributes. In addition, as skilled individuals will appreciate, the results of processing individual virtual SRP signals may be combined to determine at least one figure of merit associated with the overall print quality of the imaged graphical symbol.

Figure 6A:
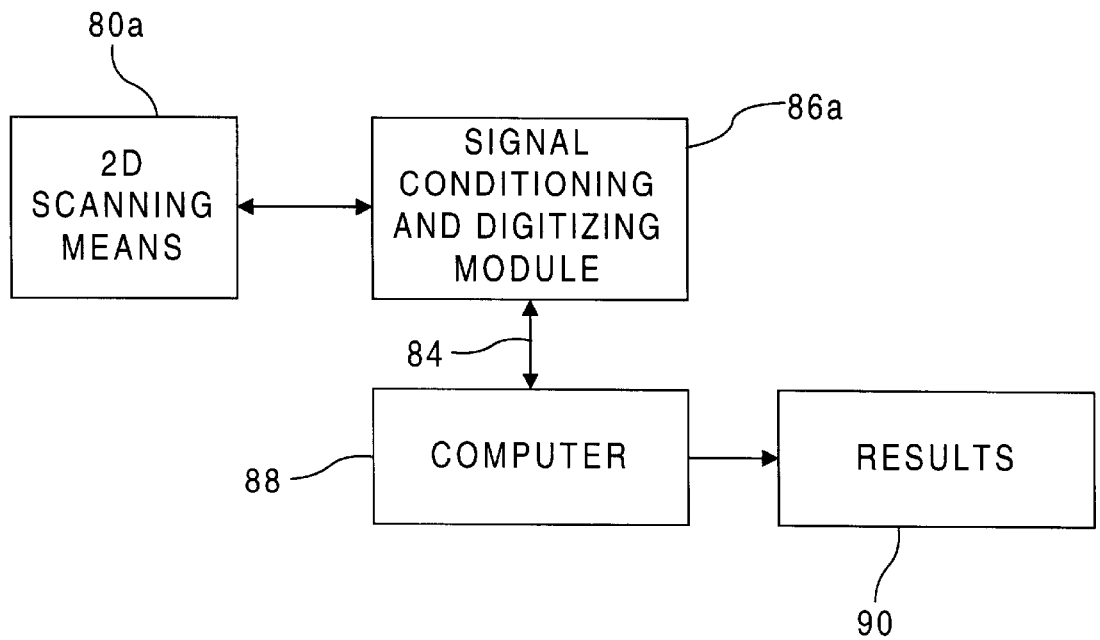
FIGS. 6A and 6B represent high level, somewhat simplified, functional block diagrams of several possible embodiments of systems that may employ the present invention.
Figure 6B:
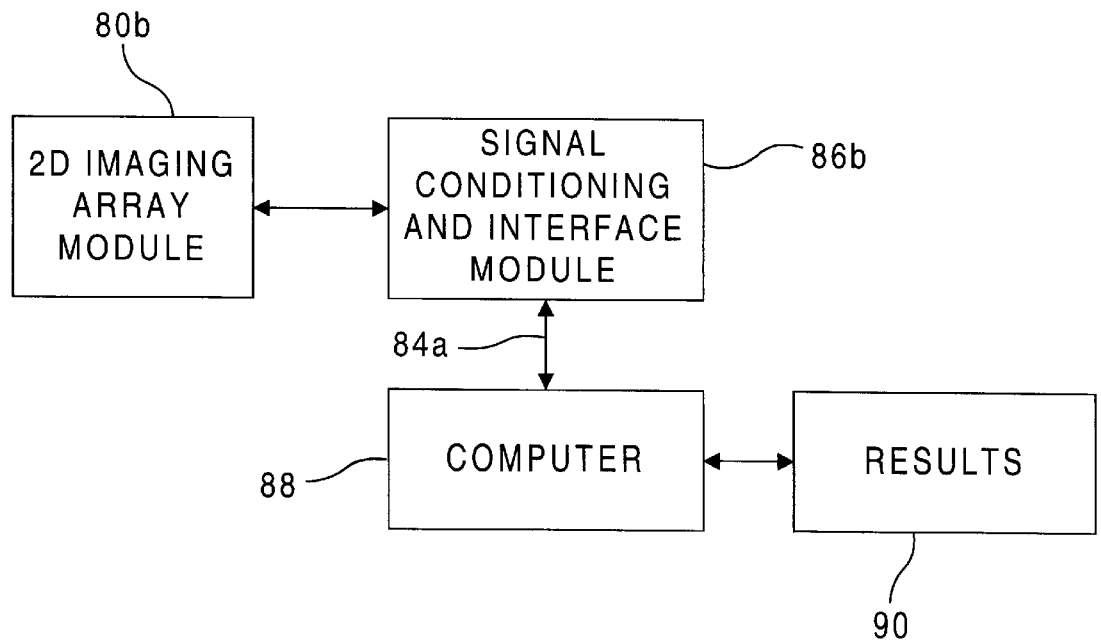

Turning now to FIGS. 6A and 6B, there are provided therein two high level simplified block diagrams for exemplary arrangements that may be employed with the present invention. Referring first to FIG. 6A, a system based on a 2D scanning means 80a generates data values by taking a plurality of preferably equi-spaced, parallel scans (e.g., as shown in FIG. 4). A signal conditioning and digitizing module 86a may be included to receive, provide signal conditioning (as required), and digitize each respective (actual) SRP signal produced with each scan across a graphical symbol being evaluated. As shown, a link 84 may be included to support the exchange of information (including image data) between the signal conditioning and digitizing module 86a and a computer 88. This image data may be collectively termed a 'digitized raster image'. It is contemplated that the computer 88 would be programmed to receive and process a plurality of the data values produced by the digitizing of the actual SRP signals. As discussed above, the data values collected by the scanning of the graphical symbol may be processed (when required) to determine virtual SRP signals (associated with virtual scans), which in turn may be processed to yield one or more figures of merit indicative of the print quality of an imaged or scanned symbol. The figures of merit may then be indicated to an operator via results 90. The results 90 may be provided by way of front panel annunciators, a display unit, an audio tone (or message), and or via a hardcopy printout.

Turning now to FIG. 6B, another embodiment of a system based on a 2D imaging array module 80b, which may be provided by a charge-coupled device (CCD). The CCD generates raw image data in the form of a plurality of data values (at a selected point in time) that represent the 2D image data of an imaged region (containing therein a graphical symbol). For this embodiment, digitized gray-scale data values (i.e., raw image data) are preferably provided directly to a signal conditioning and interface module 86b. The data values received by the signal conditioning and interface module 86b, would be coupled to the computer 88 via link 84a for processing (as discussed above when referring to FIG. 6A). It should be noted that the signal conditioning and interface module 86b may actually be provided as a portion of the computer 88.

It is important to note that the embodiments of FIGS. 6A and 6B define two embodiments employing two exemplary 'front end' imaging arrangements: namely a controlled scanning means and a CCD based means. Skilled persons would certainly be able to provide a number of modifications and variations to the embodiments provided. Further, if the graphical symbol to be evaluated is situated upon a moving substrate, then a simple laser scanner or a linear CCD imaging device may be employed. It should be noted that any arrangement that will enable 2D digitized image data to be collected, say in the form of a plurality of data values with each having a known spatial position, may be employed with the methods of the present invention. Accordingly, the term 'collecting', as applied to the data values of the 2D image data to be processed, is to be broadly defined and indicative of any suitable arrangement that may provide and make available such data values.

Turning now to FIG. 7, a preferred method of the invention will now be presented. As shown, the method may commence at 100 with the collecting of the 2D image data, including a plurality of data values associated with the imaging of the graphical symbol to be evaluated for print quality. Next, at 104 the collected data values are processed to determine at least one virtual scan of interest. Once the virtual scan along a desired scan path is determined, the data values of the virtual scan (which establish a digitized virtual SRP signal) are available for processing at 108. Importantly, each virtual SRP signal determined may be processed to determine one or more figures of merit or print quality attributes to quantitatively indicate the print quality of the scanned and evaluated graphical symbol.

The embodiment of the method of FIG. 7 is but one example of a number of possible methods that may be employed utilizing the present invention. For example, methods of the invention may certainly provide for the initiation of processing and reduction of collected data values, even while other data values are being determined and made available. Accordingly, the method of FIG. 7 may be modified to support 'parallel processing' of data collection and other processing activities. In addition, the embodiment of FIG. 7 may modified to commence and operate on data that has been collected at some earlier time. As such, the first activities of the method may include the determining of data values associated with virtual scans along 'desired paths'.

While there have been described the currently preferred and most preferred embodiments of the present invention, those skilled in the art will recognize that other and further modifications may be made without departing from the invention, and it is intended to claim such all modifications and variations as fall within the scope of the invention.

What is claimed is:

1. A method of collecting and processing 2-dimensional image data values to enable an evaluating of a print quality of a data carrying graphical symbol contained within the image data, the method comprising the steps of:

a) collecting a plurality of data values, each data value representative of a level of reflectivity of an associated spatial image position within a 2-dimensional image;

b) determining virtual scan paths along desired paths, which traverse selected portions of the graphical symbol at a selected orientation;

c) extracting a plurality of the data values associated with each determined virtual scan path, wherein each plurality of data values is representative of at least portions of a digitized virtual scan reflectance profile signal;

d) processing the plurality of extracted data values of each virtual scan reflectance profile signal to provide at least one figure of merit indicative of the print quality of the imaged data carrying graphical symbol.

2. The method in accordance with claim 1, wherein figures of merit determined by processing each respective virtual scan reflectance profile signal are combined to provide an overall figure of merit indicative of the overall print quality of the imaged graphical symbol.

3. The method in accordance with claim 1, wherein the 2-dimensional image is collected by taking a succession of substantially parallel and equi-spaced scans across an image region containing the graphical symbol.

4. The method in accordance with claim 3, wherein each of the equi-spaced scans is made at an arbitrary and constant angle to the graphical symbol contained within the image data.

5. The method in accordance with claim 1, wherein the 2-dimensional image is collected by employing a 2-dimensional imaging array that generates data values in the form of a gray-scale image, with each data value having a defined spatial image position within the 2-dimensional image.

6. The method in accordance with claim 5, wherein the 2-dimensional imaging array is provided by a charge coupled imaging device, with the image data in the form of the data values collected at an arbitrary and constant angle to the graphical symbol contained within the image data.

7. The method in accordance with claim 1, wherein the processing of data values being collected commences before all the data values have been collected.

8. A method of collecting, grouping, and processing at least one virtual scan reflectance profile signal embedded within a digitized raster image, containing therein an image of a data carrying graphical symbol to be print quality evaluated, the method comprising the steps of:

a) collecting a digitized 2-dimensional raster image for the purpose of determining and processing virtual scan profile signals, with the raster image including a digitized image of the data carrying graphical symbol to be print quality evaluated, the raster image available in the form of a plurality of data values, with each data value representative of a level of reflectivity of an associated spatial image position;

b) grouping pluralities of data values to establish the virtual scan reflectance profile signals associated with virtual scan paths that traverse selected portions of the graphical symbol at a selected orientation; and c) processing each grouping of data values of each virtual scan reflectance provide signal to determine at least one figure of merit indicative of a print quality of the imaged graphical symbol.

9. The method in accordance with claim 8, wherein the digitized raster image is collected using a linear scanner that is configured to enable a succession of substantially parallel and equi-spaced scans to be taken, wherein each scan produces a plurality of data values with each data value having a known spatial image position within the 2-dimensional image.

10. The method in accordance with claim 9, wherein virtual scan paths are substantially equi-spaced and chosen to traverse the graphical symbol at an orientation that is substantially orthogonal to the height of elements of the graphical symbol.

11. The method in accordance with claim 9, wherein the data values of at least one virtual scan path are selected and grouped to include at least one entire character from at least one row of a 2-dimensional portion of the scanned graphical symbol.

12. A method of processing an image containing therein a data carrying graphical symbol, the image collected and stored as a plurality of data values, with each data value representative of a level of reflectivity of an associated spatial image position within the image, the method comprising the steps of:
   a) determining a virtual scan reflectance profile signal associated with a corresponding virtual scan path along a desired path that traverses a selected portion of the graphical symbol at a selected orientation; and
   b) processing a plurality of the data values associated with the virtual scan reflectance profile signal for evaluation purposes to determine at least one figure of merit indicative of the print quality of the graphical symbol.

13. The method in accordance with claim 12, wherein a plurality of virtual scan paths along desired paths are determined during the determining step, with each associated virtual scan reflectance profile signal processed in succession to determine a figure of merit of the overall print quality of the imaged data carrying graphical symbol.

14. A method of extracting and processing at least one virtual scan reflectance profile signal determined from data values resulting from a plurality of scans, with each scan taken at a small and constant angle with respect to a scanned 2D data carrying graphical symbol, to determine the print quality of the scanned 2D graphical symbol, the method comprising the steps of:
   a) scanning the graphical symbol at an angle sufficiently small to enable at least one character of each scanned row of the graphical symbol to be fully scanned;
   b) isolating and storing a plurality of data values associated with each selected fully scanned character of at least one selected row;
   c) processing a plurality of the stored data values so as to determine at least one print quality parameter associated with the isolated data values of each fully scanned character of the scanned graphical symbol.

15. The method in accordance with claim 14, wherein a plurality of the print quality parameters determined in step-c for each character are combined to determine an overall figure of merit indicative of the print quality of the scanned graphical symbol.

* * * * *